(12) United States Patent
Baitz

(10) Patent No.: US 8,459,558 B2
(45) Date of Patent: Jun. 11, 2013

(54) DEVICE AND METHOD FOR OPTICALLY SCANNING A MACHINE-READABLE MARKING

(75) Inventor: Guenter Baitz, Berlin (DE)

(73) Assignee: Wincor Nixdorf International GmbH (DE)

( * ) Notice: Subject to any disclaimer, the term of this patent is extended or adjusted under 35 U.S.C. 154(b) by 0 days.

(21) Appl. No.: 13/389,746

(22) PCT Filed: Jul. 8, 2010

(86) PCT No.: PCT/EP2010/004158
§ 371 (c)(1),
(2), (4) Date: Feb. 9, 2012

(87) PCT Pub. No.: WO2011/018138
PCT Pub. Date: Feb. 17, 2011

(65) Prior Publication Data
US 2012/0138687 A1    Jun. 7, 2012

(30) Foreign Application Priority Data
Aug. 11, 2009   (DE) .................. 10 2009 037 124

(51) Int. Cl.
| | |
|---|---|
| *G06F 17/00* | (2006.01) |
| *G06K 7/00* | (2006.01) |
| *G06K 7/10* | (2006.01) |
| *B65G 25/02* | (2006.01) |
| *B65G 19/00* | (2006.01) |
| *A63F 9/02* | (2006.01) |

(52) U.S. Cl.
USPC ...... 235/470; 235/375; 235/435; 235/462.01; 198/620; 198/717; 186/68; 186/69; 209/509

(58) Field of Classification Search
USPC .. 235/375, 435, 470, 462.01–462.49; 198/60, 198/620, 717; 186/68–69
See application file for complete search history.

(56) References Cited

U.S. PATENT DOCUMENTS

| | | | |
|---|---|---|---|
| 3,708,655 A | 1/1973 | Schanne | |
| 3,757,090 A * | 9/1973 | Haefeli et al. | ................. 235/437 |

(Continued)

FOREIGN PATENT DOCUMENTS

| | | |
|---|---|---|
| DE | 2 264 518 | 5/1972 |
| DE | 101 41 429 | 8/2001 |

(Continued)

OTHER PUBLICATIONS

International Search Report (in German with English translation) and Written Opinion of the International Searching Authority (in German) for PCT/EP2010/004158, mailed Oct. 18, 2010; ISA/EP.

*Primary Examiner* — Michael G Lee
*Assistant Examiner* — Laura Gudorf
(74) *Attorney, Agent, or Firm* — Harness, Dickey & Pierce, P.L.C.

(57) ABSTRACT

The invention relates to a device for optically scanning a machine-readable device applied to an object, comprising a transport apparatus for transporting the object in a transport direction, the object being supported on the transport apparatus on an underside, the transport apparatus containing a first transport belt with a first upper strand and a second transport belt with a second upper strand, wherein a gap is formed between the first transport belt and the second transport belt which is arranged ahead of the first transport belt in the transport direction, and comprising a scanning apparatus for scanning the machine-readable marking, wherein the scanning apparatus has at least one scanning element associated with the gap, wherein the first upper strand and the second upper strand are arranged so as to have a height offset relative to each other in such a way that the underside of the object can be scanned by tipping the object when the object is transferred from the first transport belt to the second transport belt.

20 Claims, 2 Drawing Sheets

U.S. PATENT DOCUMENTS

| | | | |
|---|---|---|---|
| 3,792,234 A * | 2/1974 | Sturzenegger | 235/483 |
| 5,252,814 A * | 10/1993 | Tooley | 235/383 |
| 5,543,607 A | 8/1996 | Watanabe et al. | |
| 5,984,186 A * | 11/1999 | Tafoya | 235/462.24 |
| 6,142,376 A | 11/2000 | Cherry et al. | |
| D536,192 S | 2/2007 | Kruse et al. | |
| 7,387,241 B2 | 6/2008 | Hassenbuerger | |
| 7,407,056 B2 | 8/2008 | Lutz | |
| 8,074,785 B2 | 12/2011 | Twiste | |
| 2006/0266824 A1 | 11/2006 | Hassenbuerger | |
| 2006/0283943 A1 | 12/2006 | Ostrowski et al. | |
| 2008/0110724 A1 | 5/2008 | Twiste | |
| 2009/0039164 A1 | 2/2009 | Herwig et al. | |
| 2010/0072220 A1 | 3/2010 | Michels | |
| 2010/0258381 A1 | 10/2010 | Baitz et al. | |
| 2012/0018520 A1 | 1/2012 | Twiste | |

FOREIGN PATENT DOCUMENTS

| | | |
|---|---|---|
| DE | 202 06 878 | 4/2002 |
| DE | 102 35 865 | 8/2002 |
| DE | 10141429 C1 | 1/2003 |
| DE | 20 2005 007 089 | 5/2005 |
| DE | 20 2004 021 433 | 3/2008 |
| DE | 10 2008 044 795 | 8/2008 |
| DE | 20 2008 012 862 | 9/2008 |

* cited by examiner

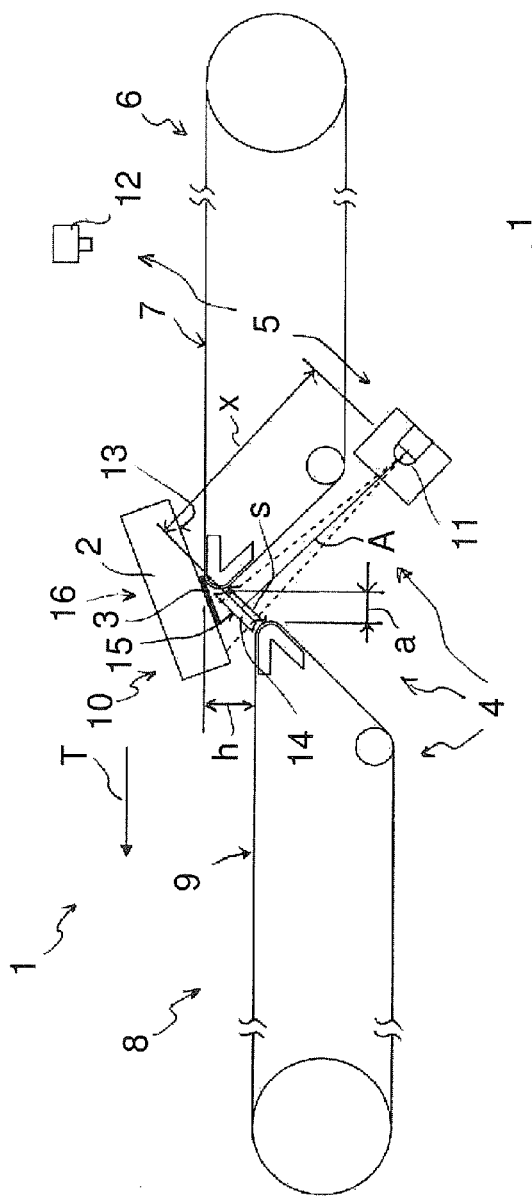
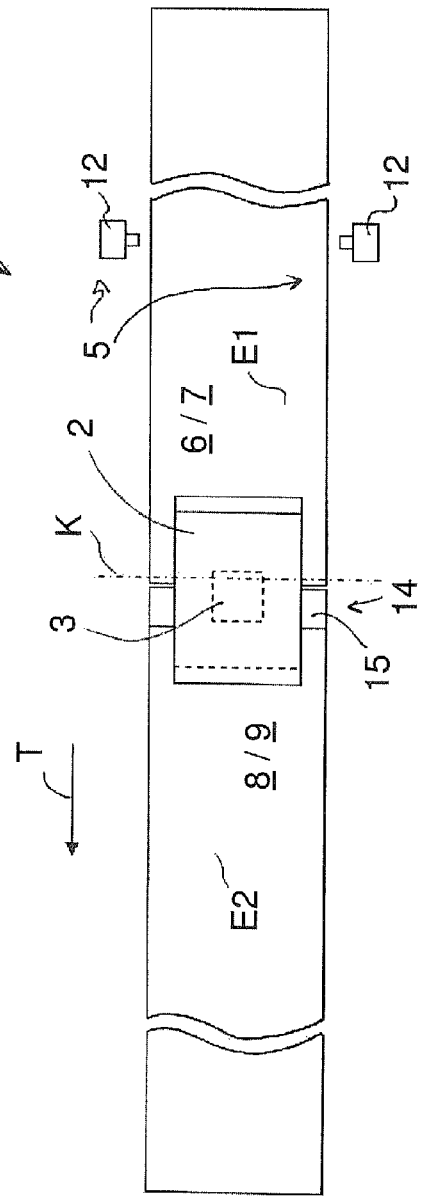
Figure 1
Figure 2

DEVICE AND METHOD FOR OPTICALLY SCANNING A MACHINE-READABLE MARKING

CROSS-REFERENCE TO RELATED APPLICATIONS

This application is a National Stage of International Application No. PCT/EP2010/004158, filed Jul. 8, 2010. This application claims the benefit and priority of German Application 10 2009 037 124.9, filed Aug. 11, 2009. The entire disclosures of the above applications are incorporated herein by reference.

BACKGROUND

This section provides background information related to the present disclosure which is not necessarily prior art.

TECHNICAL FIELD

The invention relates to a device for optically scanning a machine-readable marking applied to an object, comprising a transport apparatus for transporting the object in a transport direction, the object being supported on the transport device at the underside of the object, the transport apparatus containing a first transport belt having a first upper strand and second transport belt having a second upper strand, wherein a gap is formed between the first transport belt and the second transport belt which is arranged in front of the first transport belt in the transport direction, and comprising a scanning apparatus for scanning the machine-readable marking, wherein the scanning apparatus has at least one scanning element associated with the gap.

DISCUSSION

The invention further relates to a method for optically scanning a machine-readable marking applied to an object, wherein the object being supported on the transport apparatus at the underside of the object and transported in a transport direction is transferred from a first transport belt of the transport apparatus having a first upper strand to a second transport belt of the transport apparatus having a second upper strand and wherein the underside of the object is scanned during the transfer by means of a scanning element of a scanning apparatus, the scanning element being associated with a gap formed between the first transport belt and the second transport belt which is arranged ahead of the first transport belt in the transport direction.

The articles (objects) selected by a customer are usually recorded individually at a checkout lane of a retail store by a cashier when the machine-readable markings on the objects, a barcode for example, are optically scanned by a scanning apparatus that functions as a marking reader. This arduous, error-prone, time-consuming work can be simplified considerably by an automated recording process in which the customer places the selected objects on a transport belt and the objects are scanned automatically in a scanning apparatus. This recording of the objects becomes problematic, however, when the machine-readable marking is applied on the underside of the object lying on the transport belt.

A device for optically scanning the machine-readable marking applied to the object is known from DE 101 41 429 C1, by means of which the underside of the object can also be scanned. To do this, the device has a transport apparatus having a first transport belt and a second transport belt. The first transport belt and the second transport belt are arranged offset to each other in the transport direction of the objects such that a gap is formed between the ends of the transport belts facing each another. The transport belts are arranged at the same height, or on a common transport plane. A scanning element of a scanning apparatus for the optical scanning of the entire object is arranged on a side of the gap facing away from the object. The scanning element records the underside of the object during the transfer of said object from the first transport belt to the second transport belt. The disadvantage here is that any horizontal spacing of the first transport belt from the second transport belt must be relatively large in dimension for the reliable recording of the machine-readable marking using the scanning element. Small objects in particular can fall through the gap. It is not possible to transfer the objects from the first transport belt to the second transport belt in this case. The suggested provision of a transparent cover in the area of the gap also does not solve the problem because small objects in particular are not lying on either the first transport belt or the second transport belt and inasmuch are not conveyed in the transport direction. Automatic recording of the objects is, therefore, not guaranteed.

SUMMARY OF THE INVENTION

An object of the invention is, therefore, to cite a device and a method for optically scanning a machine-readable marking applied to the object so that the marking applied to an underside of the object lying on the transport belt can be recorded simply and reliably. The device is to be cost-effective and robust at the same time.

To achieve this object, the preferred embodiment of the invention is characterized in that during the transfer from the first transport belt to the second transport belt, because of an offset in height of the upper strand of the first transport belt and that of the second transport belt, the object is tipped in order to scan the underside of the object using the scanning element.

The particular advantage of the invention is that through the offset height arrangement of the first upper strand and the second upper strand, an adequately wide gap for scanning the underside of the object is created between the transport belts even if no, or only a very small, horizontal spacing is created between the first transport belt and the second transport belt. Said gap is defined essentially by a horizontal gap element. As a result, even small objects can be transferred reliably and safely from the first transport belt to the second transport belt. Completely automated recording of small objects is thus ensured.

In accordance with a preferred embodiment of the invention, the first transport belt and the second transport belt form a step in the area of the gap. The upper strand of the first transport belt is arranged above the upper strand of the second transport belt. By providing a step of this type, the object tips when it is transferred from the first transport belt to the second transport belt simply because of gravity, that is to say automatically. As a result, the transfer is particularly simple. No special components or subcomponents need to be provided for the transfer of the objects.

In accordance with a further development of the invention, an offset in height between the first upper strand and the second upper strand is selected such that, when a forward part of the object is transferred to the second transport belt, a rear part of the object is still supported on the first transport belt. A free fall of the objects during the transfer is thus advantageously prevented. Mechanical stress on the object during the transfer is reduced so that damage to the object is prevented.

Protection from damage is of great importance, particularly in the case of delicate objects, such as eggs, vegetables, porcelain and glassware.

In accordance with a further development of the invention, the scanning element is arranged such that, by means of said element, the underside of the object in the tipped position can be scanned at least in sections. Advantageously, through an inclined arrangement of the scanning element, for example tipping said element relative to the vertical, the error rate of the scanning process can be reduced, and scanning of the machine-readable marking can be especially designed to be especially reliable. Furthermore, the horizontal spacing of the transport belts can be further reduced through the inclined arrangement of the scanning element.

In accordance with a further development of the invention, the ends of the first transport belt and of the second transport belt facing each other in the transport direction can be arranged to overlap, at least in sections. A horizontal gap element is completely dispensed with as a result of the overlapping arrangement of the end faces. In this case, a horizontal overlap of said end faces is formed instead of a horizontal space between the first transport belt and the second transport belt. The overlap advantageously prevents particularly small objects from falling into the gap between the first transport belt and the second transport belt and being damaged or lost, or prevents said objects from damaging the scanning element arranged below the gap.

In accordance with a further development of the invention, an end of the second strand facing the first transport belt in the transport direction is located ahead of an end of the first transport belt facing the second transport belt. As a result, the gap has a horizontal gap element. Positioning of the scanning element on the side of the gap facing away from the object can be accomplished as a result in a particular simple manner.

In accordance with a further development of the invention, a transparent cover is arranged in the area of the gap as part of the transport apparatus, having an inclined surface tilted on a slant relative to the horizontal. The object can be guided along this inclined surface as it is transferred from the first transport belt to the second transport belt. Providing a suitable cover, first of all reliably prevents even small objects from falling into the gap formed between the first transport belt and the second transport belt. This is principally—but not exclusively—advantageous when the gap has a horizontal gap element. Secondly, the mechanical stress on the object as it is being transferred is further reduced when a cover is provided. The object can slide or slip on the inclined surface of the cover. It is likewise possible that a curved outer surface in particular, for example bottles, cans or similar, roll down the inclined surface. As said bottles or cans are rolling, at least one part of the outer surface of the rolling object can be optically scanned by the scanning element.

In accordance with a further development of the invention, the inclined surface of the cover is arranged essentially perpendicular to an optical axis of the scanning element. As a result, the error rate of the scanning element is advantageously reduced, and especially reliable scanning of the machine-readable marking is ensured.

In accordance with a further development of the invention, the ends of the first upper strand and the second upper strand associated with each other are immediately adjacent the cover. The risk of jamming is advantageously reduced as a result, so that even with automated, unsupervised use of the device by an uninitiated customer, safe operation of said device is ensured.

In accordance with a further development of the invention, there is a space between the scanning element and the gap, or the cover, in the range of 3 mm to 100 mm. Experience has shown that commercial scanning elements operate within this range so that the required high rate of reliability can be ensured.

To achieve its object, the invention preferably is characterized in that the object is tipped during the transfer from the first transport belt to the second transport belt because of the offset of the upper strand of the first transport belt to the second transport belt.

The particular advantage of the invention is that by tipping the object and by providing a height offset, an underside of the object can be reliably scanned. To accomplish this, the gap must have only a very small, or even no, horizontal gap element so that automated recording of even particularly small objects is reliably ensured by the device. Small objects are safely prevented from falling into the gap.

BRIEF DESCRIPTION OF THE DRAWINGS

Embodiments of the invention are explained in greater details hereinafter using the Figures.

The drawings described herein are for illustrative purposes only of selected embodiments and not all possible implementations, and are not intended to limit the scope of the present disclosure.

FIG. 1 shows a side view of a device in accordance with the invention in a first embodiment, FIG. 2 shows a plan view of the device from FIG. 1.

Corresponding reference numerals indicate corresponding parts throughout the several views of the drawings.

DETAILED DESCRIPTION OF THE PREFERRED EMBODIMENTS

Figure 3:
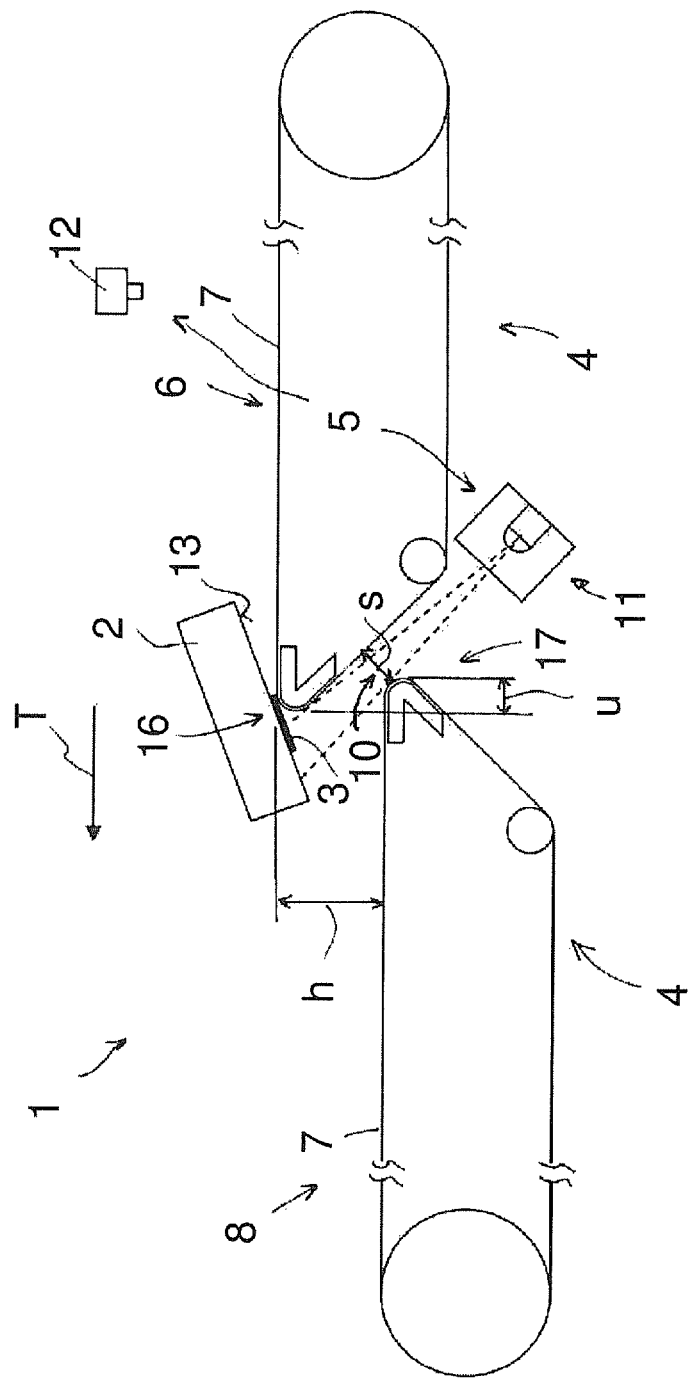
FIG. 3 shows a side view of a second embodiment of the invention.

Example embodiments will now be described more fully with reference to the accompanying drawings.

A device 1 for optically scanning a machine-readable marking 3 applied to an object 2 has a transport apparatus 4 and a scanning module 5 as its essential functional modules. Such devices 1 are used, for example, by the retail trade at checkout lanes for recording goods and subsequently determining the price. They are found in use in particular at the self-checkout at which the customer's items are scanned by machine, that is to say automatically, and not by a cash register attendant.

The transport unit 4 has a circulating, endless first transport belt 6 with a first upper strand 7 and a circulating, endless second transport belt 8 with a second upper strand 9 located ahead of the first transport belt 6 as viewed in the transport direction T. The first transport belt 6 is spaced apart from the second transport belt 8 in such a manner that a gap 10 is formed between the transport belts 6, 8.

The upper strand 7 of the first transport belt 6 and the upper strand 9 of the second transport belt 8 are arranged offset in height relative to each other. As a result, a step is formed between the first transport belt 6 and the second transport belt 8 in the area of the gap 10, wherein the first upper strand 7 is arranged above the second upper strand 9 by a height offset h. Furthermore, the first transport belt 6 and the second transport belt 8 are arranged spaced apart by a horizontal space a. The horizontal space a of the transport belts 6, 8 defines a horizontal gap component of the gap 10. One end of the second transport belt 8 facing the first transport belt 6 is arranged ahead of one end of the first transport belt 6 facing the second transport belt 8, as viewed in the transport direction T.

The scanning apparatus 5 has a scanning element 11. The scanning element 11 is associated with the gap 10 on one side facing away from the object 2 during the transfer of the object 2. The scanning apparatus 5 further comprises a plurality of additional scanning elements 12 that are arranged to the side of and above the first transport belt 6. The scanning element 11 associated with the gap 10 serves to optically scan the underside 13 of the object 2 in the area of the gap 10. The additional scanning elements 12 record the lateral surfaces of the object 2 not lying on the scanning apparatus so that said object can be scanned around its periphery by the transport apparatus 5. A plurality of different optical sensors can be employed as scanning elements 11, 12, by means of which the machine-readable marking 3 on the object 2 can be recorded. For example, scanners, specifically line scanners, photo element lines or cameras are suitable as scanning elements 11, 12. All or some of the scanning elements 11, 12 can be arranged in a common subassembly, for example a tunnel scanner.

A cover 14 is arranged in the area of the gap 10 between the first transport belt 6 and the second transport belt 8. Said cover is immediately adjacent the end of the first upper strand 7 facing the second transport belt 8 and the end of the second upper strand 9 facing the first transport belt 6. The cover 14 has an inclined surface 15 on one side which faces away from the scanning element 11 and faces toward the object 2 during the transfer; said surface is arranged at an angle with respect to the horizontal as well as to a first transport plane E1, defined by the upper strand 7, and to a second transport plane E2, defined by the second upper strand 9. When the object 2 is transferred from the first transport belt 6 to the second transport belt 8, said object can be guided along the inclined surface 15. In order to ensure optical scanning of the underside 3 of the object 2 through the cover 14, the 14 cover is to be transparent. It consists, at least in sections of toughened glass, acrylic or another sufficiently transparent material that is chemically and mechanically resistant.

The scanning element 11 for scanning the underside 13 of the object 2 is arranged below the gap 10 in such a manner that the underside 13 of the object 2 can be scanned through the gap 10 during the transfer of said object from the first transport belt 6 to the second transport belt 8. An optical axis A of the scanning element 11 is aligned essentially perpendicular to the inclined surface 15 of the cover 14. The scanning element 14 is at a distance x from the gap 10 or the cover 14, respectively, that is less than 500 mm and preferably lies in a range between 3 mm and 100 mm.

The first upper strand 7 and the second upper strand 9 are arranged oriented horizontally in the present embodiment. This ensures that the object 2 is supported stably while it is being transported and does not slide or roll from the transport apparatus 4.

Because of the height offset h between the first upper strand 7 and the second upper strand 9, the object 2 is tipped as it is transferred from the first transport belt 6 to the second transport belt 8. The scanning element 11 is arranged below the gap 10 in such a manner that the underside 13 of the object 2 can be scanned during this tipping action. In order to make said tipping possible, the gap 10 is defined with an optically usable gap width s due to the height offset h of the upper strands 7, 9 and the horizontal space a. The gap width s is established in the design in such a way that the machine-readable marking 3 on the underside 13 of the object 2 can be read by the scanning element 11, irrespective of the orientation of the object 2 on the transport apparatus 4 as said object is transferred from the first transport belt 6 to the second transport belt 8. The height offset h is advantageously selected such that as the front area of the object 2 is transferred to the second transport belt 8, the rear area of the object 2 is still touching the first transport belt 6.

As the object 2 is transferred from the first transport belt 6 to the second transport belt 8, the object 2 tips about a tipping axis K that is oriented horizontally and perpendicular to the transport direction T in the present embodiment. Depending on the size of the object 2, the height offset h and the concrete geometric shape of an end face 16 of the first transport belt 6 facing the second transport belt 8, the location of the tipping axis K shifts during the tipping action. The tipping axis K is generally defined by the line of contact between the first transport belt 6 and the object 2 during the transfer of said object to the second transport belt 8.

In order to record the machine-readable marking 3 on the object 2 automatically, the latter is first placed with its underside 13 on the first upper strand 7 of the transport apparatus 4. Provided that the object 2 is placed on the first upper strand 7 on the side of the additional scanning elements 12 facing away from the gap 10, the lateral surfaces of the object 2 not lying on the transport apparatus can be scanned by the additional scanning elements 12 while the object 2 is being transported in the transport direction T. As the object 2 is transported in transport direction T, said object is transferred from the first transport belt 6 to the second transport belt 8 in the area of the gap 10. At the transfer, the underside 13 of the object 2 is scanned by means of the scanning element 11 of the scanning apparatus 5, and the object 2 is tipped because of the height offset h between the first upper strand 7 and the second upper strand 9, whereby object 2 is transferred automatically under the effect of gravity from the first upper strand 7 to the second upper strand 9 arranged below the first upper strand 7. The scanning element 11 arranged on the side of the gap 10 facing away from the object 2 scans the underside 13 of the object 2. Since the transparent cover is arranged in the area of the gap 10, the object 2 can be guided with its underside 13 at least partially along the inclined surface 15 of the cover 14 during the transfer from the first upper strand 7 to the second upper strand 9. After the object 2 has been transferred, said object is transported further in transport direction T by the second transport belt 8.

In accordance with a further embodiment of the invention from FIG. 3, end faces 16, 17 of the first transport belt 6 and the second transport belt 8 facing each other in the transport direction T are arranged at least in sections to be overlapping. In this embodiment too, in spite of the lack of a horizontal space a because of the height offset h between the first upper strand 7 and the second upper strand 9, a gap having the gap width s is created. The overlap u of the transport belts 6, 8 in the horizontal direction and the height offset h are selected such that the underside 13 of the object 2 can be scanned through the gap 10 by the scanning element 11.

Identical components and component functions of the embodiments are assigned the same reference numerals.

As a result of the overlap of the end faces 16, 17, the object 2 cannot fall into the gap 10 as it is transferred from the first transport belt 6 to the second transport belt 8. For this reason it is possible to dispense with a cover 14. Dispensing with the cover is optional; that is to say, a cover 14 can be provided in another embodiment in spite of an overlapping arrangement of the transport belts 6, 8.

In accordance with an alternative embodiment of the invention, not shown, a plurality of scanning elements 11 can be arranged below the gap 10 for scanning the underside 13 of the object 2. The optical axis A of the scanning element 11 does not need to be aligned essentially perpendicular to the inclined surface 15 of the cover 14 that is angled with respect to the horizontal.

In accordance with a further embodiment of the device 1, not shown and pertinent to the invention, the transport apparatus 4 contain a first transport belt 6 having an upper strand 7 and a storage container in which objects 2 can be held in readiness for transfer to the customers. A gap is 10 is formed between the storage container arranged ahead of the first transport belt 6 in the transport direction T and the first transport belt 6. The device 1 further has a scanning apparatus 5 for scanning the machine-readable marking 3, wherein the scanning apparatus 5 has at least one scanning element 11 that is associated with the gap 10 on a side facing away from the gap 10. The upper strand 7 of the first transport belt 6 and the storage container are arranged offset in height in such a manner that by tipping the object 2 as it is transferred from the first transport belt 6 to the storage container the underside 13 of the object 2 can be scanned by the scanning element 11. Here too, in the area of the gap 10 a transparent cover 14 can be arranged as part of the transport apparatus 4, with an inclined surface 15 tilted with respect to the horizontal, along which the object 2 can be guided during the transfer from the first transport belt 6 to the storage container. The storage container can be configured at least in sections as a slide.

The foregoing description of the embodiments has been provided for purposes of illustration and description. It is not intended to be exhaustive or to limit the invention. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the invention, and all such modifications are intended to be included within the scope of the invention.

What is claimed:

1. A device for optically scanning a machine-readable marking applied to an object comprising a transport apparatus to transport the object in a transport direction, the object being supported on the transport apparatus at the underside of the object, the transport apparatus containing a first transport belt with a first upper strand and a second transport belt with a second upper strand, wherein a gap is formed between the first transport belt and the second transport belt which is arranged ahead of the first transport belt in the transport direction, and a scanning apparatus for scanning the machine-readable marking, wherein the scanning apparatus has at least one scanning element associated with the gap, wherein the first upper strand and the second upper strand are arranged to have a height offset relative to each other such that that the underside of the object can be scanned by the scanning element by tipping the object when the object is transferred from the first transport belt to the second transport belt; wherein end faces of the first transport belt and of the second transport belt facing each other in the transport direction are arranged overlapping at least in sections.

2. The device according to claim 1, wherein the first transport belt and the second transport belt form a step in the area of the gap, wherein the first upper strand is arranged above the second upper strand.

3. The device according to claim 1, wherein a height offset of the first and second upper strands is selected in such a way that when a forward area of the object is transferred to the second transport belt, a rear area of the object still touches the first transport belt.

4. The device according to claim 1, wherein the scanning element is arranged in such a way that the underside of the tipped object can be scanned at least in sections by means of said scanning element.

5. The device according to claim 1, wherein, at the transfer from the first transport belt to the second transport belt, the object is tipped about a horizontal tipping axis and/or a tipping axis oriented perpendicular to the transport direction and/or a tipping axis lying in a transport plane defined by the first upper strand or the second upper strand.

6. The device according to claim 1, wherein one end of the first upper strand facing the second transport belt is arranged in the transport direction ahead of one end of the second upper strand facing the first transport belt.

7. The device according to claim 1, wherein the end of the second upper strand facing the first transport belt is arranged in the transport direction ahead of the end of the first upper strand facing the second transport belt.

8. The device according to claim 1, wherein a transparent cover is arranged in the area of the gap as part of the transport apparatus having an inclined surface tilted relative to the horizontal, along which the object can be guided when said object is transferred from the first transport belt to the second transport belt.

9. The device according to claim 8, wherein the inclined surface of the cover is arranged essentially perpendicular to an optical axis of the scanning element.

10. The device according to claim 9, wherein the end of the first upper strand facing the second transport belt and the end of the second upper strand facing the first transport belt are immediately adjacent the cover.

11. The device according to claim 1, wherein the cover is formed of toughened glass, acrylic or synthetic material at least in some areas.

12. The device according to claim 1, wherein a gap width of the gap is defined by the height offset and a horizontal distance or a horizontal overlap of the end of the first upper strand facing the second transport belt and of the end of the second upper strand facing the first transport belt in such a way that the machine-readable marking applied on the underside of the object can be read by the scanning element irrespective of the orientation of the object on the transport apparatus.

13. The device according to claim 1, wherein a distance of the scanning element is between 3 mm and 100 mm from the gap or a cover.

14. The device according to claim 1, wherein the scanning apparatus has at least one additional scanning element directed at the object that is arranged above and/or spaced apart laterally from the transport apparatus for scanning lateral surfaces of the object not lying on the transport apparatus.

15. The device according to claim 1, wherein the first upper strand and/or the second upper strand is/are arranged oriented horizontally.

16. The device according to claim 1, wherein the scanning apparatus has a line scanner, a photo element line or a camera.

17. A method for optically scanning a machine-readable marking applied to an object comprising: wherein the object being transported in a transport direction is supported on an underside on the transport device and is transferred from a first transport belt of the transport device containing a first upper strand to a second transport belt of the transport device containing a second upper strand and wherein the underside of the object is scanned by a scanning element as said object is transferred, said element being associated with a gap formed between the first transport belt and the second transport belt which is arranged ahead of the first transport belt in the transport direction, wherein the object is tipped as said object is transferred from the first transport belt to the second transport belt by reason of a height offset of the first upper strand and the second upper strand in order to scan the underside of the object by means of the scanning element; wherein end faces of the first transport belt and of the second transport belt facing each other in the transport direction are arranged overlapping at least in sections.

18. The method according to claim 17, wherein the object is transferred under the effect of gravity automatically from the first upper strand to the second upper strand which is arranged below said upper strand.

19. The method according to claim 17, wherein the object is guided at least in sections on an inclined surface of a cover arranged in the area of the gap as said object is transferred from the first upper strand to the second upper strand.

20. A device for optically scanning a machine-readable marking of an object comprising:

a first transport belt including a first upper strand and a first end face;

a second transport belt including a second upper strand and a second end face opposite to and facing the first end face, the first end face and the second end face overlap in a transport direction;

a gap defined between the first transport belt and the second transport belt; and a scanning apparatus including a scanning element directed to the gap and configured to read the machine-readable marking when the machine-readable marking is at the gap;

wherein the first upper strand and the second upper strand are arranged to have a height offset relative to each other such that an underside of the object can be scanned by the scanning element by tipping the object when the object is transferred from the first transport belt to the second transport belt.

* * * * *